United States Patent
Kagata et al.

(10) Patent No.: US 9,580,614 B2
(45) Date of Patent: Feb. 28, 2017

(54) INK SET AND RECORDING METHOD

(71) Applicant: Seiko Epson Corporation, Tokyo (JP)

(72) Inventors: Takayoshi Kagata, Shiojiri (JP); Shohei Shiono, Matsumoto (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/187,121

(22) Filed: Jun. 20, 2016

(65) Prior Publication Data

US 2016/0297979 A1    Oct. 13, 2016

Related U.S. Application Data

(62) Division of application No. 14/224,419, filed on Mar. 25, 2014, now Pat. No. 9,394,451.

(30) Foreign Application Priority Data

Mar. 29, 2013 (JP) ................. 2013-071631

(51) Int. Cl.
  *B41J 2/21*       (2006.01)
  *C09D 11/322*    (2014.01)
  *C09D 11/38*     (2014.01)

(52) U.S. Cl.
  CPC ........... *C09D 11/322* (2013.01); *B41J 2/2107* (2013.01); *C09D 11/38* (2013.01)

(58) Field of Classification Search
  CPC .......... B41J 2/2107; B41J 2/01; B41J 2/5052; B41M 1/18; C09D 11/322; C09D 11/38
  See application file for complete search history.

(56) References Cited

U.S. PATENT DOCUMENTS

| 9,108,404 B2 | 8/2015 | Okuyama |
| 2002/0038613 A1 | 4/2002 | Yatake |
| 2009/0274840 A1 | 11/2009 | Yamakami et al. |
| 2010/0321430 A1* | 12/2010 | Koganehira ........... C09D 11/38 347/9 |
| 2011/0165387 A1 | 7/2011 | Kondo |
| 2013/0300802 A1 | 11/2013 | Yamakami et al. |

FOREIGN PATENT DOCUMENTS

| JP | 2002-003768 A | 1/2002 |
| JP | 2009-287003 A | 12/2009 |

* cited by examiner

*Primary Examiner* — Geoffrey Mruk
(74) *Attorney, Agent, or Firm* — Harness, Dickey & Pierce, P.L.C.

(57) ABSTRACT

The ink set of the invention includes a first ink composition and a second ink composition. The first ink composition contains a first pigment and an alkanediol having 6 or less carbon atoms and having a normal boiling point of 245° C. or more. The content of the first pigment is 1.5% by mass or more, and the content of the alkanediol is 3% by mass or more and 20% by mass or less. The second ink composition contains a second pigment and a penetrant other than the alkanediol. The content of the second pigment is less than 1.5% by mass. The penetrant contained in the second ink composition has an osmotic force higher than that of the alkanediol contained in the first ink composition.

8 Claims, 1 Drawing Sheet

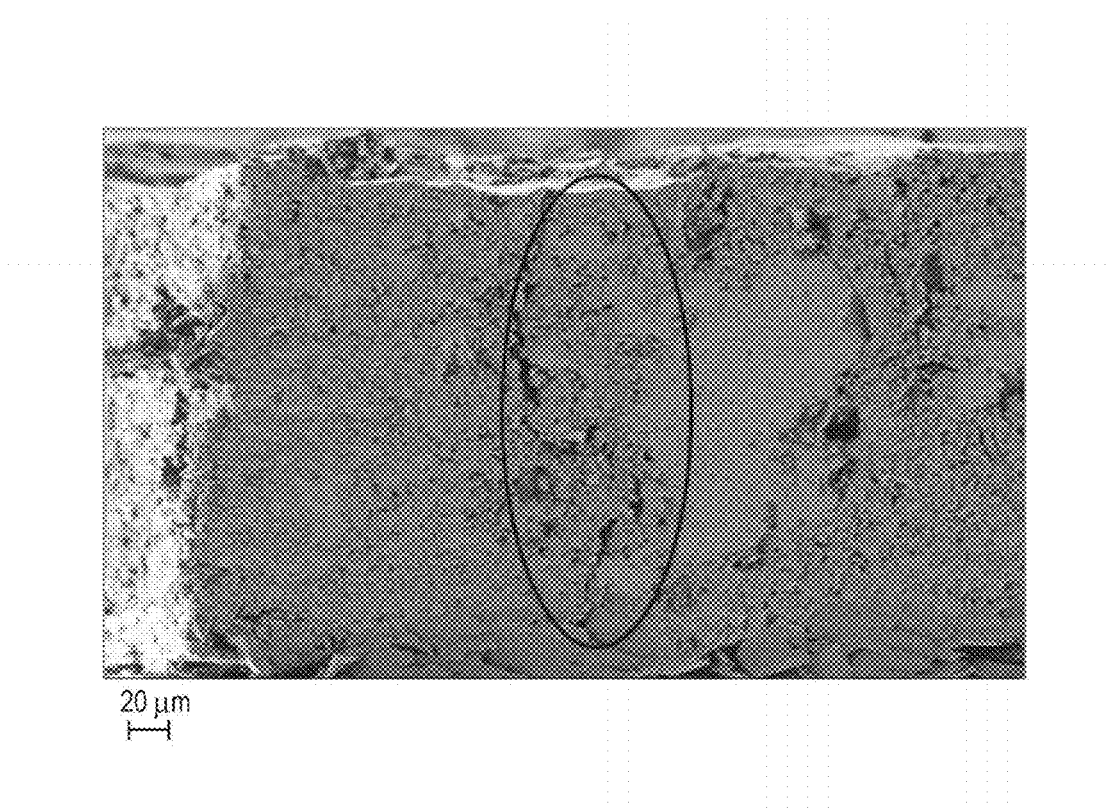

INK SET AND RECORDING METHOD

CROSS-REFERENCE TO RELATED APPLICATIONS

This application is a divisional of U.S. patent application Ser. No. 14/224,419, filed Mar. 25, 2014, which claims priority to Japanese Patent Application No. 2013-071631, filed Mar. 29, 2013, the disclosures of which are hereby expressly incorporated by reference herein in their entireties.

BACKGROUND

1. Technical Field

The present invention relates to an ink set and a recording method.

2. Related Art

A recording method using an ink jet recording system is performed by discharging droplets of an ink and allowing the ink droplets to fly and adhere to (land on) a recording medium such as paper. Because of recent innovative progress in the ink jet recording technology, the recording method using the ink jet recording system has been also employed in the field of highly fine image recording (image printing), which was ever achieved by photograph or offset printing.

In order to perform recording with higher fineness by the ink jet recording system, the volume of ink droplets to be discharged must be significantly small, such as several picoliters, and the diameter and the spacing of nozzles for discharging an ink are further reduced. For example, JP-A-2009-287003 discloses an ink jet recording ink containing a specific alkanediol, such as 1,2-hexanediol, that can be applied to a recording head corresponding to high image quality (a recording head composed of first nozzles having a relatively short passage and second nozzles having a relatively long passage alternately arranged at intervals of less than 30 μm).

Unfortunately, since the ink jet recording ink described in JP-A-2009-287003 contains a penetrant having a low boiling point, the volatile organic compounds (VOC) in the organic solvent from a recorded image disadvantageously increase. Accordingly, a reduction in the volume of VOC by using a penetrant having a high normal boiling point may be effective. However, in an ink jet recording ink containing a penetrant having a high normal boiling point, after landing of the ink droplets on a recording medium, water preferentially evaporates to give a penetrant rich state, and the dispersibility of a pigment is destroyed to cause aggregation. Consequently, the graininess of the recorded image is deteriorated. The present inventors have revealed through their studies that this problem significantly occurs in recording on a recording medium having low affinity to ink compositions or in using a thin ink composition having a low pigment concentration.

SUMMARY

An advantage of some aspects of the invention is to provide an ink set that can reduce the VOC generation from a recorded image and shows broad adaptability to a variety of recording media to form a satisfactory image in which dot unevenness and granular quality due to dots are low even in recording on a recording medium having low affinity to ink compositions and to provide a recording method using the ink set.

Application Example 1

An embodiment of the ink set according to the invention is an ink set comprising a first ink composition and a second ink composition. The first ink composition contains a first pigment and an alkanediol. The alkanediol has 6 or less carbon atoms and has a normal boiling point of 245° C. or more. The content of the first pigment is 1.5% by mass or more and the content of the alkanediol is 3% by mass or more and 20% by mass or less. The second ink composition contains a second pigment and a penetrant other than the alkanediol. The content of the second pigment is less than 1.5% by mass. The second ink composition has an osmotic force higher than that of the first ink composition.

In the ink set of application example 1, the first ink composition containing the first pigment having a content of 1.5% by mass or more (hereinafter, also referred to as "thick ink composition") contains an alkanediol having 6 or less carbon atoms and having a normal boiling point of 245° C. or more and thereby can reduce the VOC generation from the recorded image, resulting in a reduction in the load on the environment. In addition, the second ink composition containing the second pigment having a content of less than 1.5% by mass (hereinafter, also referred to as "thin ink composition") contains a penetrant having an osmotic force higher than that of the alkanediol contained in the thick ink composition. Consequently, a satisfactory image in which dot unevenness and granular quantity due to dots are low can be obtained even in recording on a recording medium having low affinity to ink compositions. Furthermore, an ink set including compositions such as those in this application example can be an ink set suitable for, for example, a recording method using an ink jet recording system.

Application Example 2

In the ink set according to application example 1, in landing of the same amounts of the first ink composition and the second ink composition, the time $t_1$ for reducing the dot height $d_1$ of the first ink composition immediately after landing to $0.1d_1$ and the time $t_2$ for reducing the dot height $d_2$ of the second ink composition immediately after landing to $0.1d_2$ may satisfy a relationship of $t_1 > t_2$.

Application Example 3

In the ink set according to application example 1 or 2, the alkanediol contained in the first ink composition and the penetrant contained in the second ink composition each have a branched structure.

Application Example 4

In the ink set according to any one of application examples 1 to 3, the penetrant contained in the second ink composition may be a polyhydric alcohol or a glycol ether having 4 to 8 carbon atoms.

Application Example 5

An embodiment of the recording method according to the invention is a recording method using an ink set according to any one of application examples 1 to 4. The method records an image on a recording medium by discharging ink droplets of the first ink composition and/or the second ink composition with a recording head.

In the recording method according to application example 5, since the ink set according to any one the application examples is used, the VOC generation from a recorded image can be reduced, and a satisfactory image in which dot unevenness and granular quality due to dots are low can be formed even in recording on a recording medium having low affinity to ink compositions.

Application Example 6

In the recording method according to application example 5, each ink droplets may have a volume of 20 picoliters or less.

Application Example 7

In the recording method according to application example 5 or 6, the recording head may discharge ink droplets with a piezoelectric element and may have a resolution of 300 dpi or more per unit length.

Application Example 8

In the recording method according to any one of application examples 5 to 7, the recording medium may have a receiving layer on a surface, and the receiving layer may have a nonpolar component γsd of the surface free energy of 20 mN/m or less calculated by the following expressions (1) and (2):

$$\gamma l_M(1+\cos\theta_M)=2(\gamma sd\cdot\gamma ld_M)^{0.5}+2(\gamma sp\cdot\gamma lp_M)^{0.5} \quad (1)$$

$$\gamma l_W(1+\cos\theta_W)=2(\gamma sd\cdot\gamma ld_W)^{0.5}+2(\gamma sp\cdot\gamma lp_W)^{0.5} \quad (2).$$

In expressions (1) and (2), $\gamma ld_M$ denotes the nonpolar component of the surface free energy of diiodomethane; $\gamma lp_M$ denotes the polar component of the surface free energy of diiodomethane; $\gamma l_M$ denotes the surface free energy ($=\gamma ld+\gamma lp$) of diiodomethane; $\theta_M$ denotes the contact angle of diiodomethane on the receiving layer; $\gamma ld_W$ denotes the nonpolar component of the surface free energy of water; $\gamma lp_W$ denotes the polar component of the surface free energy of water; $\gamma l_W$ denotes the surface free energy ($=\gamma ld+\gamma lp$) of water; $\theta_W$ denotes the contact angle of water on the receiving layer; γsd denotes the nonpolar component of the surface free energy of the receiving layer; and γsp denotes the polar component of the surface free energy of the receiving layer.

BRIEF DESCRIPTION OF THE DRAWINGS

The invention will be described with reference to the accompanying drawing, wherein like numbers reference like elements.

FIGURE is a scanning electron microscopic (SEM) photograph of a cross-section of the receiving layer of a recording medium.

DESCRIPTION OF EXEMPLARY EMBODIMENTS

Preferred embodiments of some aspects of the invention will now be described. The embodiments described below are merely examples of the invention. The invention is not limited to the following embodiments and includes various modifications implemented within the gist of the invention.

1. Ink Set

The ink set according to this embodiment includes a first ink composition and a second ink composition. The first ink composition contains a first pigment and an alkanediol having 6 or less carbon atoms and having a normal boiling point of 245° C. or more. The content of the first pigment is 1.5% by mass or more and the content of the alkanediol is 3% by mass or more and 20% by mass or less. The second ink composition contains a second pigment and a penetrant other than the alkanediol. The content of the second pigment is less than 1.5% by mass. In the ink set according to the embodiment, the penetrant contained in the second ink composition has an osmotic force higher than that of the alkanediol contained in the first ink composition. The first ink composition and the second ink composition constituting the ink set according to the embodiment will now be described in this order. Not all of the ink compositions in an ink set necessarily satisfy the above-described requirements.

1.1. First Ink Composition
1.1.1. First Pigment

The first ink composition contains the first pigment in a content of 1.5% by mass or more and is a so-called thick ink composition. That is, the first ink composition contains 1.5% by mass or more of the first pigment and 3% by mass or more and 20% by mass or less of an alkanediol having 6 or less of carbon atoms and having a normal boiling point of 245° C. or more. The content of the first pigment in the first ink composition is preferably 1.5% by mass or more and 8% by mass or less and more preferably 2% by mass or more and 6% by mass or less. The first pigment may be any pigment and may be an inorganic pigment or an organic pigment.

Usable examples of the inorganic pigment include carbon blacks (C.I. Pigment Black 7), such as furnace black, lamp black, acetylene black, and channel black; iron oxide; and titanium oxide.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye chelates and acid dye chelates); dye lakes (e.g., basic dye lakes and acid dye lakes); and nitro pigments, nitroso pigments, aniline black, and daylight fluorescent pigments. These pigments may be used alone or in combination.

Examples of yellow organic pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

Examples of magenta organic pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of cyan organic pigments include C.I. Pigment Blue 1, 2, 3, 15, 15:1, 15:2, 15:3, 15:4, 15:6, 15:34, 16, 18, 22, 25, 60, 65, and 66; and C.I. Vat Blue 4 and 60.

Examples of green pigments include C.I. Pigment Green 7 (phthalocyanine green), 10 (green gold), 36, 37, and 58. These pigments may be used alone or in combination. Among these pigments, preferred are phthalocyanine pigments such as C.I. Pigment Green 7, 36, 37, and 58.

Examples of orange pigments include C.I. Pigment Orange 2, 5, 7, 13, 14, 15, 16, 24, 34, 36, 38, 40, 43, 63, and 64. Among these pigments, preferred are C.I. Pigment Orange 36 and 43.

The first pigment may be, for example, a chromatic organic pigment having a color, such as yellow (Y), magenta (M), cyan (C), orange (Or), or green (Gr), corresponding to a color ink composition. Alternatively, the first pigment may be, for example, a black pigment (inorganic pigment) for a black (K) ink composition.

1.1.2. Alkanediol

The first ink composition contains an alkanediol having 6 or less carbon atoms and having a normal boiling point of 245° C. or more (hereinafter, also referred to as "specific alkanediol"). Examples of such a specific alkanediol include 3-methyl-1,5-pentanediol, 1,6-hexanediol, and (R)-(+)-2-methyl-1,4-butanediol. The alkanediol preferably has a branched structure from the viewpoint of better permeability and wettability. Among these alkanediols, 3-methyl-1,5-pentanediol is particularly preferred. The first ink composition containing such a specific alkanediol can reduce the VOC generation from a recorded image. Such a specific alkanediol has low permeability (wettability), but when it is added to a thick ink composition containing a first pigment in an amount of 1.5% by mass or more, the ink composition can provide a satisfactory image in which dot unevenness and granular quality due to the dots are low. The reason for this is believed that since the pigment concentration of the first ink composition is higher than that of the second ink composition, the influence by aggregation of the pigment is low and unremarkable.

The content of the specific alkanediol in the first ink composition is 3% by mass or more and 20% by mass or less, preferably 3% by mass or more and 15% by mass or less, and more preferably 3% by mass or more and 10% by mass or less. The first ink composition containing the specific alkanediol within this range can easily provide a satisfactory image in which dot unevenness and granular quality by dots are low.

1.1.3. Water

When the first ink composition contains water, water mainly functions as a medium for dispersing the pigment. The first ink composition may be an aqueous ink containing 25% by mass or more of water or may be a non-aqueous ink containing less than 25% by mass of water. The first ink composition is preferably an aqueous ink having improved fixability and orientation on a recording medium of the pigment due to rapid decrease of the solvent on the recording medium.

1.1.4. Other Additives

The first ink composition may contain an organic solvent such as a polyhydric alcohol or a glycol ether, a resin for dispersing the first pigment, a surfactant, and other components.

Polyhydric Alcohol

Examples of the polyhydric alcohol include ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, trimethylolpropane, 1,2-butanediol, 1,2-hexanediol, 1,2-heptanediol, and 1,2-octanediol.

Glycol Ether

Examples of the glycol ether include lower alkyl ethers of polyhydric alcohols such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether.

From the viewpoint of reducing the VOC generation, it is preferred that the first ink composition do not substantially contain an organic solvent having a normal boiling point of less than 245° C.

Throughout the specification, "not substantially contain" means that, for example, the content is not higher than 1.0% by mass, preferably not higher than 0.5% by mass, more preferably not higher than 0.1% by mass, more preferably not higher than 0.05% by mass, more preferably not higher than 0.01% by mass, and most preferably not higher than 0.001% by mass, based on the total mass (100% by mass) of the ink.

Resin

The resin contained in the first ink composition functions as a dispersant for dispersing a pigment. Examples of the resin include, but not limited to, polyacrylic acid, polymethacrylic acid, polymethacrylate, polyethylacrylate, styrene-butadiene copolymers, polybutadiene, acrylonitrile-butadiene copolymers, chloroprene copolymers, fluororesins, vinylidene fluoride, polyolefin resins, cellulose, styrene-acrylic acid copolymers, styrene-methacrylic acid copolymers, polystyrene, styrene-acrylamide copolymers, polyisobutyl acrylate, polyacrylonitrile, polyvinyl acetate, polyvinyl acetal, polyvinylpyrrolidone, polyamide, rosin resins, fluorene resins, polyethylene, polycarbonate, vinylidene chloride resins, cellulose resins such as cellulose acetate butyrate, vinyl acetate resins, ethylene-vinyl acetate copolymers, vinyl acetate-acrylic copolymers, vinyl chloride resins, polyurethane, and rosin esters. These resins may be used alone or in combination.

The amount of the resin is preferably 10 parts by mass or more and 300 parts by mass or less and more preferably 50 parts by mass or more and 250 parts by mass or less based on 100 parts by mass of the pigment. Within this range, the pigment is further stably dispersed in water.

Surfactant

The surfactant may be of any type and is preferably an acetylene glycol surfactant or polysiloxane surfactant. The acetylene glycol surfactant and polysiloxane surfactant can enhance the wettability to a recording surface of, for example, a recording medium to enhance the permeability of the ink composition.

The polysiloxane surfactant is, for example, a polyether modified organosiloxane. More specifically, examples of the polysiloxane surfactant include BYK-306, BYK-307, BYK-333, BYK-341, BYK-345, BYK-346, and BYK-348 (these are trade names of products manufactured by BYK-Chemie Japan, Inc.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (these are trade names of products manufactured by Shin-Etsu Chemical Co., Ltd.).

Examples of the acetylene glycol surfactant include Surfynol series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (these are trade names of products manufactured by Air Products and Chemicals Inc.); Olfine series B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (these are trade names of products manufactured by Nissin Chemical Industry Co. Ltd.), and Acetyrenol series E00, E00P, E40, and E100 (these are trade names of products manufactured by Kawaken Fine Chemicals Co., Ltd.).

The content of the surfactant in the first ink composition is preferably 0.1% by mass or more and 1.5% by mass or less and more preferably 0.1% by mass or more and 1.0% by mass or less.

Other Components

The ink composition may contain components (other components), in addition to the above-described components. Such components are, for example, a pH adjuster, an organic binder, a urea compound, a saccharide, and a drying suppressant such as an alkanolamine (e.g., triethanolamine).

1.2. Second Ink Composition

The second ink composition contains the second pigment in a content of less than 1.5% by mass and is a so-called thin ink composition. That is, the second ink composition contains a second pigment in an amount of less than 1.5% by mass and a penetrant other than the specific alkanediol. The penetrant contained in the second ink composition has an osmotic force higher than that of the specific alkanediol. The content of the second pigment in the second ink composition is preferably 0.05% by mass or more and 1.2% by mass or less and more preferably 0.1% by mass or more and 1% by mass or less.

Examples of the second pigment include the same pigments exemplified as the first pigment in the first ink composition. The second pigment may be, for example, a chromatic organic pigment having a color, such as light yellow (Ly), light magenta (Lm), or light cyan (Lc), corresponding to a color ink composition. Alternatively, the second pigment may be a black pigment (inorganic pigment) for a gray (Lk) or light gray (LLk) ink composition. The first pigment and the second pigment may be the same.

Since the second ink composition has a low pigment concentration of less than 1.5% by mass, after landing of the ink droplets on a recording medium, water preferentially evaporates to give a penetrant rich state, and the dispersibility of the pigment is destroyed to cause aggregation. Consequently, a problem that the graininess of the recorded image is deteriorated is apt to occur. In particular, the influence by the aggregation of a pigment onto the image quality tends to be high and remarkable in recording on a recording medium having low affinity to ink compositions. In addition, since the pigment concentration is low, the influence is significantly remarkable when an unintentionally high color development region is caused by aggregation. Accordingly, the second ink composition preferably contains a penetrant having excellent permeability (wettability) different from the specific alkanediol contained in the first ink composition. As a result, the ink composition can show broad adaptability to a variety of recording media.

Examples of the penetrant includes the polyhydric alcohols and the glycol ethers exemplified in the first ink composition and preferably include polyhydric alcohols and glycol ethers having 4 to 8 carbon atoms. In the second ink composition containing a polyhydric alcohol or glycol ether having 4 to 8 carbon atoms, the permeability (wettability) is improved. The polyhydric alcohol or glycol ether more preferably has a normal boiling point of 200° C. or more (preferably 200° C. or more and less than 245° C.). In the second ink composition containing a polyhydric alcohol or glycol ether having a normal boiling point of 200° C. or more, the permeability (wettability) is improved and the VOC generation from a recorded image is decreased in some degree.

Preferred examples of the polyhydric alcohol include 1,2-hexanediol, 1,2-pentanediol, and 2-ethyl-1,3-hexanediol. Preferred examples of the glycol ether include triethylene glycol monobutyl ether, diethylene glycol monobutyl ether, tetraethylene glycol monobutyl ether, dipropylene glycol monopropyl ether, and diethylene glycol monohexyl ether. Among these penetrants, most preferred is 1,2-hexanediol.

The content of the penetrant in the second ink composition is 3% by mass or more and 20% by mass or less, preferably 3% by mass or more and 15% by mass or less, and more preferably 3% by mass or more and 10% by mass or less. The second ink composition containing the penetrant within this range can easily provide a satisfactory image in which dot unevenness and granular quality by dots are low and can reduce the VOC generation from a recorded image.

The second ink composition may contain water, a resin, a surfactant, and other components as in the first ink composition. The content (amount) of each component in the second ink composition is similar to that in the first ink composition.

1.3. Osmotic Force of First Ink Composition and Second Ink Composition

As described above, the second ink composition contains a penetrant having an osmotic force higher than that of the specific alkanediol contained in the first ink composition and thereby has an osmotic force higher than that of the first ink composition. It can be confirmed that the osmotic force of the second ink composition is higher than that of the first ink composition by the following method.

In landing of the same amounts of a first ink composition and a second ink composition on a surface of a recording medium, when the time $t_1$ for reducing the dot height $d_1$ of the first ink composition immediately after landing to $0.1d_1$ and the time $t_2$ for reducing the dot height $d_2$ of the second ink composition immediately after landing to $0.1d_2$ satisfy a relationship of $t_1 > t_2$ (preferably $t_1 \geq 2t_2$), the osmotic force of the second ink composition is higher than that of the first ink composition. The recording medium for the measurement may be any recording medium having a smooth surface for measuring the osmotic force by observing the recording medium from a side. From the viewpoint of easily observing and clearly determining a difference in permeability, photographic paper "Gloss" manufactured by Seiko Epson Corporation is preferred.

The first ink composition and the second ink composition of the invention exert the preferred effect on a recording medium having low affinity to inks and thereby show broad adaptability to a variety of recording media. Examples of the recording medium having low affinity to inks include recording media each including a receiving layer having a nonpolar component γsd of the surface free energy of 20 mN/m or less calculated by the following expressions (1) and (2):

$$\gamma l_M (1 + \cos \theta_M) = 2(\gamma sd \cdot \gamma ld_M)^{0.5} + 2(\gamma sp \cdot \gamma lp_M)^{0.5} \qquad (1)$$

$$\gamma l_W (1 + \cos \theta_W) = 2(\gamma sd \cdot \gamma ld_W)^{0.5} + 2(\gamma sp \cdot \gamma lp_W)^{0.5} \qquad (2)$$

(in expressions (1) and (2), $\gamma ld_M$ denotes the nonpolar component of the surface free energy of diiodomethane; $\gamma lp_M$ denotes the polar component of the surface free energy of diiodomethane; $\gamma l_M$ denotes the surface free energy (=γld+γlp) of diiodomethane; $\theta_M$ denotes the contact angle of diiodomethane on the receiving layer; $\gamma ld_W$ denotes the nonpolar component of the surface free energy of water; $\gamma lp_W$ denotes the polar component of the surface free energy of water; $\gamma l_W$ denotes the surface free energy (=γld+γlp) of water; $\theta_W$ denotes the contact angle of water on the receiving layer; $\gamma sd$ denotes the nonpolar component of the surface free energy of the receiving layer; and $\gamma sp$ denotes the polar component of the surface free energy of the receiving layer).

Such a recording medium includes a layer having low affinity to the first ink composition and the second ink composition (a layer into which the first ink composition and the second ink composition are poorly absorbed). The recording medium including a receiving layer having low affinity to ink compositions is apt to cause the above-described problem, i.e., a problem of deteriorating the graininess of a recorded image by preferential evaporation of water after landing of ink droplets on a recording medium to give a penetrant rich state and thereby destroying the dispersibility of the pigment to cause aggregation. However, the use of the ink set according to an aspect of the invention allows formation of a satisfactory image in which dot unevenness and granular quality due to the dots are low even in recording on a recording medium including a receiving layer having low affinity to the ink compositions.

Expressions (1) and (2) are generally called Owens-Wendt approximation. The units of $\gamma ld_W$, $\gamma lp_W$, $\gamma l_W$, $\gamma ld_M$, $\gamma lp_M$, $\gamma l_M$ $\gamma sd$, and $\gamma sp$ in the expressions are all mN/m.

The polar component $\gamma sp$ and the nonpolar component $\gamma sd$ of a receiving layer can be determined as follows. That is, at room temperature (23° C.), 1 μL of water and 1 μL of diiodomethane are dropped onto the receiving layer, and each contact angle is measured after 100 ms from the dropping. The polar components and the nonpolar components of water and diiodomethane are known. Accordingly, the polar component $\gamma sp$ and the nonpolar component $\gamma sd$ of the receiving layer can be calculated from the simultaneous equations of an expression using the values of water and an expression using the values of diiodomethane. Note that $\gamma ld_W$, $\gamma lp_W$, and $\gamma l_W$ of water are 48.5, 2.3, and 50.8, respectively and that $\gamma ld_M$, $\gamma lp_M$, and $\gamma l_M$ of diiodomethane are 29.1, 43.7, and 72.8, respectively.

The recording medium having such a receiving layer may be any one that satisfies the above-mentioned conditions and is, for example, a recording medium having a receiving layer formed by applying a coating containing calcium hydroxide as inorganic particles onto glass fiber mixed paper as a base material, or MC mat synthetic paper (manufactured by Seiko Epson Corporation). In particular, when an image is recorded on the former recording medium using the ink set according to the invention, a satisfactory image in which dot unevenness and granular quality due to dots are low and having quality like that of paintings drawn on plaster (wall paintings) can be obtained. Accordingly, the former recording medium is preferred.

2. Recording Method

The recording method according to the embodiment records an image using the ink set described above by discharging droplets of the first ink composition and/or the second ink composition onto a recording medium from a recording head. The recording method according to the embodiment uses the ink set described above and can thereby reduce the VOC generation from a recorded image and can provide a satisfactory image in which dot unevenness and granular quality due to dots are low even in recording on a recording medium having low affinity to the ink compositions. Accordingly, the recording method according to the embodiment can show broad adaptability to a variety of recording media. An ink droplet-discharging apparatus that can be suitably used for the recording method according to the embodiment will now be described in detail.

2.1. Ink Droplet-Discharging Apparatus

The ink droplet-discharging apparatus may be a serial-type or a line-type. In these ink droplet-discharging apparatuses, the recording head mounted thereon discharges ink droplets of an ink composition from the nozzle apertures thereof at a predetermined volume (mass) and at a predetermined timing, while changing the relative position with the recording medium, and thereby allows the ink composition to adhere to the recording medium to record a predetermined image.

The recording head of the ink droplet-discharging apparatus discharges ink droplets using piezoelectric elements and preferably has a resolution of 300 dpi or more per unit length. An apparatus that includes such a recording head and can discharge ink droplets in multiple sizes (for example, in a range of 1 to 40 pL) of the first ink composition and/or the second ink composition promisingly provides further higher image quality.

The resolution per unit length of the recording head is preferably 300 dpi or more and more preferably 600 dpi or more. As a result, recording with fine ink droplets can be performed at a high density and a high speed, a satisfactory image can be formed even on a recording medium having a specific nonpolar component, and the adaptability to recording media is improved. In the use of a recording head having a low resolution, the printing speed tends to decrease if the ink droplet size is not increased. Ink droplets having a large size cause significant deterioration in image quality, such as bleeding, and are therefore difficult to be applied to the above-described recording media. However, a reduction in printing speed is not preferred from the viewpoint of productivity of a recorded matter.

Accordingly, the recording head that records an image with ink droplets having a volume of 20 pL or less is preferred. That is, the volume of each ink droplet discharged from the recording head is preferably 20 pL or less and more preferably 5 pL or more and 15 pL or less. As a result, an image more surely prevented from bleeding can be recorded on a recording medium having a certain nonpolar component.

In general, in the serial-type ink droplet-discharging apparatus, the direction transporting a recording medium and the direction of reciprocating operation of the recording head cross each other. The relative position between a recording medium and the recording head is changed by combining the operation of reciprocating the recording head and the operation of transporting the recording medium (including reciprocating operation). In this case, the recording head is usually provided with a plurality of nozzle apertures (holes for discharging ink composition) so as to form a line of the nozzle apertures (nozzle line) along the recording medium-transporting direction. The recording head may be provided with a plurality of nozzle lines according to the number of types of ink compositions.

In general, in the line-type ink droplet-discharging apparatus, one of the recording head and the recording medium is not reciprocatingly operated, and the relative position between the recording medium and the recording head is changed by transporting the recording medium. In also this case, the recording head is usually provided with a plurality of nozzle apertures so as to form a line of the nozzle apertures (nozzle line) along a direction crossing the recording medium-transporting direction.

Throughout the specification, in a serial-type ink droplet-discharging apparatus, the direction of reciprocating operation of the recording head may be referred to as "main scanning direction", and the recording medium-transporting direction may be referred to as "sub-scanning direction". In a line-type ink droplet-discharging apparatus, the recording medium-transporting direction may be referred to as "scanning direction".

The relationship between the resolution of an image recorded on a recording medium and the number of nozzle apertures in a nozzle line provided to a recording head (hereinafter also referred to as "head resolution") will now be described. If the head resolution is, for example, 360 apertures per inch (i.e., 360 dots per inch (dpi)), a line of dots is formed on a recording medium at 360 dpi so as to correspond to the arrangement of the nozzles in the nozzle line by discharging an ink composition from each nozzle aperture towards the recording medium. Even in the case of discharging ink droplets of the ink composition from each nozzle aperture while relatively moving the recording head and the recording medium in a direction crossing the nozzle line-extending direction, dots in the direction along the nozzle line direction are formed on the recording medium at a resolution of 360 dpi. That is, in this case, the resolution of the image (image resolution) in the direction along the nozzle line-extending direction is 360 dpi.

The intervals of ink droplets on a recording medium in a direction crossing the nozzle line direction of the recording head depend on the time intervals (discharge frequency) of discharging ink droplets from the nozzle apertures. When the recording head and the recording medium are relatively moved in the direction orthogonal to the nozzle line, the relationship between the image resolution and the head resolution is the same in the serial-type and line-type ink droplet-discharging apparatuses.

In the serial-type ink droplet-discharging apparatus, a recording medium can be moved in a direction crossing the direction of reciprocating operation of the recording head. Accordingly, even if the resolution of the recording head is, for example, 360 dpi, the dot intervals in the direction along the nozzle line of the image formed on the recording medium can be reduced by moving the recording medium. That is, the resolution of an image formed on a recording medium can be increased to twice the resolution in the direction along the nozzle line, i.e., 720 dpi, by performing recording on the recording medium by moving the recording head in the direction orthogonal to the nozzle line, then moving the recording medium in the direction along the nozzle line of the recording head by a distance, for example, a half of the dot interval, and performing recording again on the recording medium by moving the recording head in the direction orthogonal to the nozzle line. The movement distance of the recording medium in the direction along the nozzle line of the recording head can be set to be, for example, ⅓, ¼, or ⅛ of the dot interval. Accordingly, an image having a resolution higher than the head resolution can be easily formed. In the case of increasing the image resolution by this procedure, however, it must be noted that there is a tradeoff between the image resolution and the image recording time length.

In the serial-type ink droplet-discharging apparatus, the image resolution in the direction orthogonal to the main scanning direction is preferably 6 times or less, more preferably 4 times or less, the head resolution in the direction orthogonal to the main scanning direction. The scanning (main scanning) of the recording head and the transporting (sub-scanning) of the recording medium are preferably alternately repeated. As a result, an image can be formed at a high speed.

A line-type ink droplet-discharging apparatus can form an image at a high speed. The image resolution in the direction orthogonal to the scanning direction is preferably 6 times or less the head resolution in the direction orthogonal to the scanning direction. The transporting speed of the recording medium is preferably 30 cm/s or more, more preferably 50 cm/s or more, and most preferably 80 cm/s or more. As a result, an image can be formed at a high speed. Under this condition, if the image resolution is the same as the head resolution, an image can be formed at a further high speed.

The ink jet recording system employs the above-described serial-type or line-type ink droplet-discharging apparatus, and the system itself may be any system that can discharge an ink composition as ink droplets from fine nozzle apertures and allow the ink droplets to adhere onto a recording medium. Examples of the ink jet recording system include electrostatic aspiration systems, systems ejecting ink droplets by means of pump pressure, systems using piezoelectric elements, and systems ejecting ink droplets by means of foam formed by heating an ink solution with a microelectrode.

2.2. Recording Medium

The recording method according to the embodiment is excellent in that a satisfactory image in which dot unevenness and granular quality due to dots are low can be provided even in recording on a recording medium including a receiving layer having low affinity to ink compositions, as described above. Examples of such a recording medium include recording media each including a receiving layer having a nonpolar component $\gamma sd$ of the surface free energy of 20 mN/m or less calculated by expressions (1) and (2). Such a recording medium will now be described in detail.

The nonpolar component $\gamma sd$ of the surface free energy of the receiving layer calculated by expression (1) is 20 mN/m or more and more preferably 5 mN/m or more and 20 mN/m or less. The use of the ink set of the invention enables recording of satisfactory images even on such recording media. The polar component $\gamma sp$ of the surface free energy of the receiving layer calculated by expression (1) is preferably 20 mN/m or less and more preferably 0.1 mN/m or more and 10 mN/m or less. As a result, a recorded matter having high quality can be obtained, and the use of the ink set of the invention enables recording of satisfactory images even on such recording media.

The receiving layer of a recording medium preferably contains at least one selected from calcium carbonate, clay, talc, kaolin, and metal hydroxides and more preferably contains a metal hydroxide. Examples of the metal hydroxide constituting the receiving layer include aluminum hydroxide, calcium hydroxide, magnesium hydroxide, and zinc hydroxide. In particular, calcium hydroxide is preferred. These materials can further improve the quality like that of paintings drawn on plaster (wall paintings). In addition, after recording, the receiving layer partially varies to protect the coloring material, and thereby further excellent light resistance is provided. The metal hydroxide constituting the receiving layer is preferably in a granular form. As a result, the quality like that of paintings drawn on plaster (wall paintings) can be further improved. The light resistance of the recorded matter is also further enhanced.

The content of the metal hydroxide in the receiving layer is preferably 20% by mass or more, more preferably 20% by mass or more and 90% by mass or less, and most preferably 30% by mass or more and 80% by mass or less based on the total mass of the receiving layer. As a result, the quality like that of paintings drawn on plaster (wall paintings) can be further improved. The light resistance of the recorded matter is also further enhanced.

The metal hydroxide constituting the receiving layer preferably has an average particle diameter of 0.2 μm or more and 10 μm or less and more preferably 0.4 μm or more and 7 μm or less. As a result, the quality like that of paintings drawn on plaster (wall paintings) can be further improved. The light resistance of the recorded matter is also further enhanced. The receiving layer preferably has a thickness of 50 μm or more and 1000 μm or less and more preferably 100 μm or more and 800 μm or less. As a result, the quality like that of paintings drawn on plaster (wall paintings) can be further improved. The light resistance of the recorded matter is also further enhanced. The recording medium may be composed of the receiving layer only and is preferably composed of the receiving layer and a substrate for holding the receiving layer thereon. As a result, the stability in the shape and the transportability of the recording medium are improved, the productivity of the recorded matter is enhanced, and the resulting recorded matter can have particularly excellent reliability.

The base material may be any material and is preferably, for example, paper or a woven or nonwoven fabric of glass fibers, vinylon fibers, polypropylene fibers, polyester fibers, polyethylene-terephthalate fibers, acrylic fibers, aramid fibers, or carbon fibers. The receiving layer optionally contains resin particles, amorphous silica, porous silicate, a weak acid salt or oxide of a divalent metal such as magnesium or zinc, natural or synthetic zeolite, alumina, diatomite, synthetic mica, clay of various types, talc, calcium carbonate, kaolin, acid clay, or activated clay.

The receiving layer may have a cracking region (cracks) extending from the surface to the base material. The above-described recording media may have such cracking, but a satisfactory image can be recorded even on such a recording medium by utilizing the invention. Furthermore, bleeding can be effectively prevented, and a recorded matter having a printed portion with a sufficient image concentration and having quality like that of paintings drawn on plaster (wall paintings) can be provided.

3. Examples

The embodiments of the invention will now be more specifically described by examples and comparative examples, but the invention is not limited to the following examples.

3.1. Preparation of Each Ink Composition

Table 1 shows ink compositions specifically prepared as the first ink compositions and the second ink compositions. The first ink compositions prepared as thick ink compositions were yellow (Y), magenta (M), cyan (C), and black (K) ink compositions. The second ink compositions prepared as thin ink compositions were light magenta (Lm), light cyan (Lc), gray (Lk), and light gray (LLk) ink compositions.

The pigments in the ink compositions were C.I. Pigment Yellow 74 for the yellow (Y) ink, C.I. Pigment Blue 15:3 for the cyan (C) and light cyan (Lc) inks, C.I. Pigment Violet 19 for the magenta (M) and light magenta (Lm) inks, and Carbon Black for the black (K), gray (Lk), and light gray (LLk) inks. The content of each pigment is shown in Table 1.

The pigment, a styrene-acrylic acid copolymer (weight-average molecular weight: 78000, resin acid value: 100), and deionized water (a part) were mixed by stirring. The mixture was subjected to dispersion treatment using zirconia beads (diameter: 1.5 mm) with a sand mill (manufactured by Yasukawa Seisakusyo K. K.) for 6 hours. Subsequently, the zirconia beads were removed with a separator to give each pigment dispersion.

The resulting pigment dispersions were mixed with glycerin, a surfactant (product name: "BYK-348", a silicon-containing surfactant manufactured by BYK-Chemie Japan, Inc.), triethanolamine, a penetrant shown in Table 2, and deionized water so as to give the compositions shown in Table 1. Subsequently, each mixture was stirred at room temperature for 1 hour and was then filtered through a membrane filter with a pore size of 5 μm to prepare each ink composition. The numerical values shown in Table 1 are contents (in terms of % by mass) in each ink.

The abbreviations of penetrants shown in Table 2 refer to the following compounds:
MPD: 3-methyl-1,5-pentanediol
BTG: triethylene glycol monobutyl ether
1,2-HD: 1,2-hexanediol
1,6-HD: 1,6-hexanediol

TABLE 1

Unit: % by mass

| | First ink composition (thick ink composition) | | | | Second ink composition (thin ink composition) | | | |
| --- | --- | --- | --- | --- | --- | --- | --- | --- |
| | Y | M | C | K | Lm | Lc | Lk | LLk |
| Pigment | 5 | 5 | 4 | 2 | 1 | 1 | 0.8 | 0.3 |
| Glycerin | 10 | 10 | 10 | 15 | 22 | 22 | 22 | 24 |
| Surfactant (BYK-348) | 0.5 | 0.6 | 0.4 | 0.5 | 0.5 | 0.5 | 0.5 | 0.5 |
| Triethanolamine | 1 | 1 | 1 | 1 | 1 | 1 | 1 | 1 |
| Resin (dispersant) (styrene-acrylic acid copolymer) | 3 | 3 | 2.8 | 2.5 | 2 | 2 | 1.2 | 0.6 |
| Penetrant | See Table 2 | | | | | | | |
| Water | balance | balance | balance | balance | balance | balance | balance | balance |

3.2. Method of Evaluation (1) Evaluation of VOC Generation

The VOC generation was evaluated using an ink jet printer (Model: PX-H8000, manufactured by Seiko Epson Corporation) in accordance with the measuring process and evaluation conditions by The Blue Angel (German Institute for Quality Assurance and Labelling). Criteria of judgment are as follows:

Judgment of VOC:
Good: VOC generation of 5 mg/hr or less, and
Poor: VOC generation of exceeding 5 mg/hr.

(2) Evaluation of Graininess

The graininess was evaluated in accordance with a monograph "The evaluation of image quality in ink jet recording" by The imaging Society of Japan (Japan hardcopy '99 Proceedings (pp. 291-294)). Specifically, dedicated images for evaluating graininess (gradation patches) were recorded using ink sets according to Examples 1 to 6 and Comparative Examples 1 to 7. The resulting recorded matters were scanned with a scanner and were processed into electronic data, and graininess index values were calculated with dedicated software. PX-H8000 (manufactured by Seiko Epson Corporation) was used as the ink jet printer, and recording was performed at a resolution of 720×720 dpi. As the recording medium, recording medium A or recording medium B described below was used. The scanner used was GT-X770 (manufactured by Seiko Epson Corporation), and the image data was collected at a resolution of 1200 dpi and an analysis object region of 256×256 pixels as analytical data. The graininess was evaluated based on the calculated graininess index values according to the following criteria:

Judgment of Graininess:
Good: graininess index of less than 0.28,
Fair: graininess index of 0.28 or more and less than 0.30, and
Poor: graininess index of 0.30 or more.

Recording medium A used for evaluating graininess was composed of glass fiber mixed paper serving as a base material and a receiving layer formed by applying a coating containing calcium hydroxide as inorganic particles (average particle diameter: 1 μm) onto the glass fiber mixed paper. The content of calcium hydroxide was 50% by mass based on the total mass of the receiving layer. FIGURE is a scanning electron microscopic (SEM) photograph of a cross-section of the receiving layer of recording medium A. As obvious from FIGURE, the receiving layer of recording medium A had a cracking region (cracks) extending from the surface to the base material. The nonpolar component γsd of the surface free energy of recording medium A was 15.4 mN/m, and the polar component of γsp of the surface free energy was 0.3 mN/m.

Recording medium B used for evaluating graininess was mat film paper (MC mat synthetic paper manufactured by Seiko Epson Corporation) having a receiving layer. The nonpolar component γsd of the surface free energy of recording medium B was 19.6 mN/m, and the polar component of γsp of the surface free energy was 20 mN/m.

(3) Measurement of Osmotic Force

Ink compositions (Lk1 to Lk3) containing different penetrants as shown in Table 3 were prepared as in above. The ink compositions were loaded on an ink jet printer (model: PX-G930, manufactured by Seiko Epson Corporation), and ink droplets having a volume of 11 pL were discharged onto photographic paper "Gloss" (manufactured by Seiko Epson Corporation). The ink droplets were photographed with a high-speed camera (product name: MEMRECAM GX-1 Plus, manufactured by nac Image Technology Inc.), and the time for reducing the dot height d (100%) at the time of landing to 0.1d (10%) was determined to measure the osmotic force of each ink composition. The shorter time means that the ink composition has a higher osmotic force. The results are shown in Table 3.

3.3. Evaluation Results

Table 2 shows the evaluation results of VOC generation and graininess of the ink sets in Examples 1 to 6 and Comparative Examples 1 to 7.

TABLE 2

| | First ink composition (thick ink composition) | | Second ink composition (thin ink composition) | | | Evaluation results | |
|---|---|---|---|---|---|---|---|
| | Type of penetrant | Penetrant content (% by mass) | Type of penetrant | Penetrant content (% by mass) | Type of medium | VOC judgment | Graininess |
| Example 1 | MPD | 5 | 1,2-HD | 5 | recording medium A | good | good: 0.26 |
| Example 2 | MPD | 10 | 1,2-HD | 10 | recording medium A | good | good: 0.27 |
| Example 3 | MPD | 18 | 1,2-HD | 18 | recording medium A | good | good: 0.27 |
| Example 4 | MPD | 5 | BTG | 5 | recording medium A | good | fair: 0.29 |
| Example 5 | 1,6-HD | 5 | 1,2-HD | 5 | recording medium A | good | fair: 0.28 |
| Example 6 | MPD | 5 | 1,2-HD | 5 | recording medium B | good | good: 0.27 |
| Comparative Example 1 | 1,2-HD | 5 | 1,2-HD | 5 | recording medium A | poor | good: 0.27 |
| Comparative Example 2 | MPD | 5 | MPD | 5 | recording medium A | good | poor: 0.31 |
| Comparative Example 3 | 1,2-HD | 5 | MPD | 5 | recording medium A | good | poor: 0.33 |
| Comparative Example 4 | 1,2-HD | 5 | MPD | 10 | recording medium A | good | poor: 0.30 |
| Comparative Example 5 | MPD | 2 | 1,2-HD | 2 | recording medium A | good | poor: 0.31 |
| Comparative Example 6 | MPD | 25 | 1,2-HD | 25 | recording medium A | poor | good: 0.27 |
| Comparative Example 7 | MPD | 5 | MPD | 5 | recording medium B | good | poor: 0.32 |

As obvious from Table 2, the ink sets according to Examples 1 to 6 gave satisfactory results in evaluations of VOC and graininess in recording on recording medium A and recording medium B having low affinity to inks. On the other hand, the ink sets according to Comparative Examples 1 to 7 were poor in VOC or graininess evaluation.

Table 3 shows the results of measurement of osmotic forces of ink compositions (Lk1 to Lk3) evaluated by using different penetrants.

TABLE 3

|  |  | Ink composition for measuring dot height | | |
|---|---|---|---|---|
|  |  | Lk1 | Lk2 | Lk3 |
| Pigment | | 0.8 | 0.8 | 0.8 |
| Glycerin | | 10 | 10 | 10 |
| Surfactant (BYK-348) | | 0.5 | 0.5 | 0.5 |
| Triethanolamine | | 1 | 1 | 1 |
| Resin (dispersant) (styrene-acrylic acid copolymer) | | 1.2 | 1.2 | 1.2 |
| Penetrant | MPD | 10 | — | — |
|  | BTG | — | 10 | — |
|  | 1,2-HD | — | — | 10 |
| Water | | balance | balance | balance |
| Time (ms) for reducing the dot height d to 0.1d | | 45 | 18 | 13 |

As obvious from Table 3, the times for reducing the dot heights d of ink compositions (Lk1 to Lk3) to 0.1d suggest that the osmotic forces of the penetrants are 1,2-hexanediol (1,2-HD)>triethylene glycol monobutyl ether (BTG)>3-methyl-1,5-pentanediol (MPD).

The invention is not limited to the above-described embodiments, and various modifications are possible. For example, the invention includes methods or compositions that are substantially the same as those described in the embodiments (for example, a composition involving the same function, method, and result, or a composition having the same object and effect). The invention includes methods or compositions in which parts not essential in the embodiments described above are replaced with other components. The invention also includes methods or compositions that achieve the same functions and effects or achieve the same objects of those described in the embodiments. In addition, the invention includes methods or compositions involving known techniques added to those described in the embodiments.

What is claimed is:

1. An ink set comprising:
   a first ink composition containing a first pigment of 1.5% by mass or more and an alkanediol of 3% by mass or more and 20% by mass or less, the alkanediol having 6 or less carbon atoms and having a normal boiling point of 245° C. or more, and the first ink composition being a thick ink composition; and
   a second ink composition containing a second pigment of less than 1.5% by mass, the second pigment being a color that is the same as the first ink composition, and includes a penetrant other than the alkanediol, the second ink composition being a thin ink composition,
   wherein the second ink composition having an osmotic force higher than that of the first ink composition, and
   wherein the ink set being for recording an image on a recording medium by discharging ink droplets of the first ink composition and the second ink composition with a recording head.

2. The ink set according to claim 1, wherein
   in landing of the same amounts of the first ink composition and the second ink composition, the time $t_1$ for reducing the dot height $d_1$ of the first ink composition immediately after landing to $0.1d_1$ and the time $t_2$ for reducing the dot height $d_2$ of the second ink composition immediately after landing to $0.1d_2$ satisfy a relationship of $t_1 > t_2$.

3. The ink set according to claim 1, wherein
   the alkanediol contained in the first ink composition have a branched structure, and the penetrant contained in the second ink composition have a branched structure.

4. The ink set according to claim 1, wherein
   the penetrant contained in the second ink composition is a polyhydric alcohol or a glycol ether having 4 to 8 carbon atoms.

5. The ink set according to claim 1, wherein
   each of the ink droplets have a volume of 20 picoliters or less.

6. The ink set according to claim 1, wherein
   the recording head discharges ink droplets with a piezoelectric element and has a resolution of 300 dpi or more per unit length.

7. The ink set according to claim 1, wherein
   the recording medium has a receiving layer on a surface, and the receiving layer has a nonpolar component γsd of the surface free energy of 20 mN/m or less calculated by the following expressions (1) and (2):

$$\gamma l_M(1+ \cos \theta_M)=2(\gamma sd \cdot \gamma ld_M)^{0.5}+2(\gamma sp \cdot \gamma lp_M)^{0.5} \quad (1)$$

$$\gamma l_W(1+ \cos \theta_W)=2(\gamma sd \cdot \gamma ld_W)^{0.5}+2(\gamma sp \cdot \gamma lp_W)^{0.5} \quad (2)$$

wherein,
   $\gamma ld_M$ denotes the nonpolar component of the surface free energy of diiodomethane;
   $\gamma lp_M$ denotes the polar component of the surface free energy of diiodomethane;
   $\gamma l_M$ denotes the surface free energy (=γld+γlp) of diiodomethane;
   $\theta_M$ denotes the contact angle of diiodomethane on the receiving layer;
   $\gamma ld_W$ denotes the nonpolar component of the surface free energy of water;
   γlp denotes the polar component of the surface free energy of water;
   $\gamma l_W$ denotes the surface free energy (=γld+γlp) of water;
   $\theta_W$ denotes the contact angle of water on the receiving layer;
   γsd denotes the nonpolar component of the surface free energy of the receiving layer; and
   γsp denotes the polar component of the surface free energy of the receiving layer.

8. The ink set according to claim 1, wherein the second ink composition contains the second pigment in an amount that ranges between 0.05% by mass to 1.2% by mass.

* * * * *